United States Patent [19]
Saito et al.

[11] Patent Number: 5,758,301
[45] Date of Patent: May 26, 1998

[54] VEHICLE CRASH DETECTION FOR IMPLEMENTATION WITH LOW COST MICROPROCESSOR

[75] Inventors: Tomomi Saito; Masaki Ohara, both of Osaka, Japan

[73] Assignee: NEC Corporation, Tokyo, Japan

[21] Appl. No.: 509,221

[22] Filed: Jul. 31, 1995

[30] Foreign Application Priority Data

Jul. 29, 1994 [JP] Japan ................................. 6-177827

[51] Int. Cl.$^6$ ................................................. G06G 7/76
[52] U.S. Cl. ............................. 701/45; 701/46; 701/47; 701/36; 180/282; 180/274; 280/735; 340/436; 307/10.1
[58] Field of Search .................... 364/424.045, 424.055, 364/424.056, 424.046; 340/436, 669; 180/282, 272, 268; 280/735, 734; 307/10.1; 701/45, 46, 47, 36

[56] References Cited

U.S. PATENT DOCUMENTS

| | | | |
|---|---|---|---|
| 5,034,891 | 7/1991 | Blackburn et al. | 364/424.057 |
| 5,036,467 | 7/1991 | Blackburn et al. | 364/424.057 |
| 5,065,322 | 11/1991 | Mazur et al. | 364/424.057 |
| 5,067,745 | 11/1991 | Yoshikawa | 364/424.056 |
| 5,068,793 | 11/1991 | Condne et al. | 364/424.056 |
| 5,073,860 | 12/1991 | Blackburn et al. | 364/424.057 |
| 5,083,276 | 1/1992 | Okano et al. | 364/424.056 |
| 5,182,459 | 1/1993 | Okano et al. | 364/424.056 |
| 5,216,607 | 6/1993 | Diller et al. | 364/424.055 |
| 5,229,943 | 7/1993 | Eigler et al. | 364/424.056 |
| 5,394,326 | 2/1995 | Liu | 364/424.056 |
| 5,394,328 | 2/1995 | Huang | 364/424.055 |
| 5,430,649 | 7/1995 | Cashler et al. | 364/424.056 |
| 5,436,838 | 7/1995 | Miyamori | 364/424.056 |
| 5,445,413 | 8/1995 | Rudolf et al. | 364/424.056 |
| 5,483,449 | 1/1996 | Caruso et al. | 364/424.056 |
| 5,490,067 | 2/1996 | Teguri et al. | 364/424.056 |
| 5,498,028 | 3/1996 | Carlin et al. | 280/735 |
| 5,508,918 | 4/1996 | Gioutsos | 364/424.056 |
| 5,521,822 | 5/1996 | Wang | 364/424.055 |
| 5,546,307 | 8/1996 | Mazur et al. | 364/424.056 |
| 5,587,906 | 12/1996 | McIver et al. | 364/424.045 |

*Primary Examiner*—Jacques H. Louis-Jacques
*Attorney, Agent, or Firm*—Sughrue, Mion, Zinn, Macpeak & Seas, PLLC

[57] ABSTRACT

The deceleration of a vehicle on receiving an impact is detected to produce an analog deceleration signal, which is converted to digital samples. The digital samples that occur during a successively shifted window are integrated to produce a velocity signal. The analog deceleration signal is passed through an analog bandpass filter to extract frequency components which appear uniquely on receiving the impact. The bandpass-filtered signal is converted to a digital bandpass-filtered signal which is converted to a first impact energy signal having an absolute digital value and the velocity signal is differentiated to produce a second impact energy signal. The first and second impact energy signals are compared with first and second threshold values and first and second decision outputs are produced when the first and second impact energy signals are respectively higher than the first and second threshold values. The velocity signal is compared with a third threshold value and a third decision output is produced when the velocity signal is higher than the third threshold value. An occupant restraint system is operated in response to the simultaneous presence of the first and third decision outputs and in response to the simultaneous presence of the second and third decision outputs. In a preferred embodiment, the velocity signal is further compared with a fourth threshold value and a fourth decision output is produced when the velocity signal is higher than the fourth threshold value. The occupant restraint system is operated in response to the simultaneous presence of the second and fourth decision outputs, instead of to the simultaneous presence of the second and third decision outputs.

22 Claims, 4 Drawing Sheets

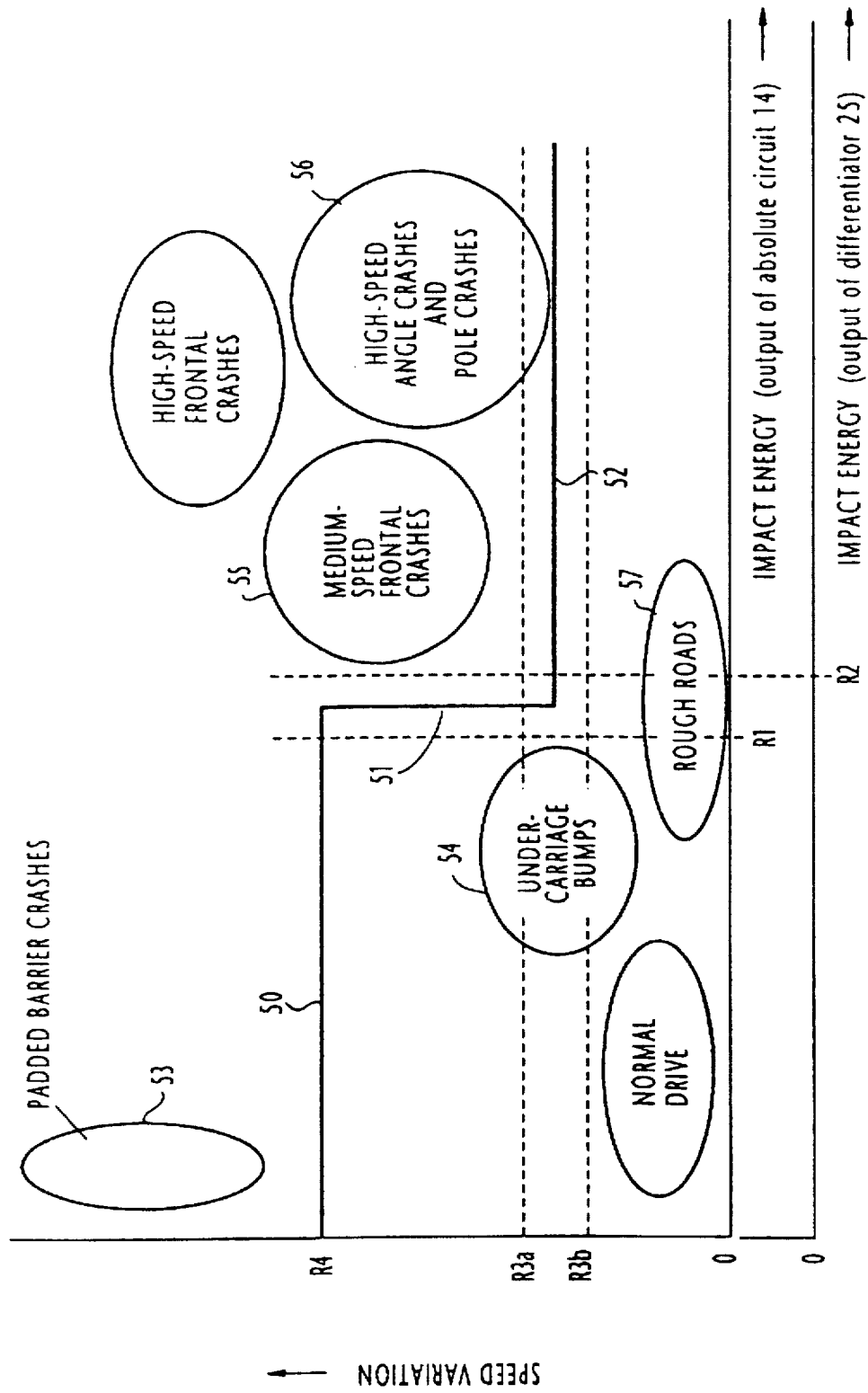

VEHICLE CRASH DETECTION FOR IMPLEMENTATION WITH LOW COST MICROPROCESSOR

BACKGROUND OF THE INVENTION

1. Field of the Invention

The present invention relates to a vehicle crash detection technique for operating an inflatable occupant restraint system.

2. Description of the Related Art

As disclosed in M. Miyamori U.S. patent application Ser. No. 08/124,229, title "Crash/Non-crash Discrnmination Using Frequency Components of Acceleration Uniquely Generated Upon Crash Impact", filed Sep. 21, 1993, now U.S. Pat. No. 5,436,838 and assigned to the same assignee as the present invention, a vehicle crash sensor includes an accelerometer for producing a deceleration signal when the vehicle receives a crash impact. A digital bandpass filter is employed for detecting the frequency components of the deceleration signal which are uniquely generated when the crash impact occurs. The energy of the impact is determined by squaring the output of the digital bandpass filter.

While the impact energy detected in this way is useful for discrimiating between crash and non-crash events, vehicle crash sensors using a digital bandpass filter and a squaring circuit require implementation with a 16-bit microprocessor. However, it is desirable to implement a vehicle crash sensor with an 8-bit microprocessor because its cost is much lower than the 16-bit microprocessor. In addition, a short-term sliding window integrator is provided to detect the instantaneous velocity of a crash impact. While this velocity parameter is useful for detecting a high-speed frontal crash impact, the occurrence of this parameter is delayed in the case of a vehicle with a relatively high stiffness value encountering a medium-speed frontal crash Since the vehicle deceleration during a medium-speed frontal crash increases gradually at first and then increases sharply and this crash event is near the demarcation (decision) line of a crash/non-crash discrimination diagram, the delay introduced to the short-term velocity parameter is detrimental to the deployment of the airbag during a medium-speed frontal crash.

SUMMARY OF THE INVENTION

It is therefore an object of the present invention to enable low cost implementation of a vehicle crash sensor.

Another object of the present invention is to enable precision discrimination of medium-speed frontal crash events from non-crash events.

According to a broader aspect of the present invention, the deceleration of a vehicle on receiving an impact is detected and an analog deceleration signal is produced, which is then converted to digital samples. The digital samples which occur during a specified window are integrated and the window is successively shifted by the interval of a digital sample to produce a velocity signal. The analog deceleration signal is passed through an analog bandpass filter to produce a bandpass-filtered signal containing frequency components which appear uniquely on receiving the impact. The bandpass-filtered signal is converted to a digital bandpass-filtered signal. The digital bandpass-filtered signal is converted to a first impact energy signal having an absolute digital value and the velocity signal is differentiated to produce a second impact energy signal. The first and second impact energy signals are compared with first and second threshold values and first and second decision outputs are produced when the first and second impact energy signals are respectively higher-than the first and second threshold values. The velocity signal is compared with a third threshold value and a third decision output is produced when the velocity signal is higher than the third threshold value. An occupant restraint system is operated in response to the simultaneous presence of the first and third decision outputs and response to the simultaneous presence of the second and third decision outputs.

According to a specific aspect of the present invention, the velocity signal is compared with third and fourth threshold values and third and fourth decision outputs are produced when the velocity signal is higher than the third and fourth threshold values, respectively. The occupant restraint system is operated in response to the simultaneous presence of the first and third decision outputs and in response to the simultaneous presence of the second and fourth decision outputs.

BRIEF DESCRIPTION OF THE DRAWINGS

The present invention will be described in further detail with reference to the accompanying drawings, in which:

FIG. 5 is a crash/non-crash discrimination map associated with the embodiment of FIG. 4.

DETAILED DESCRIPTION

Figure 1:
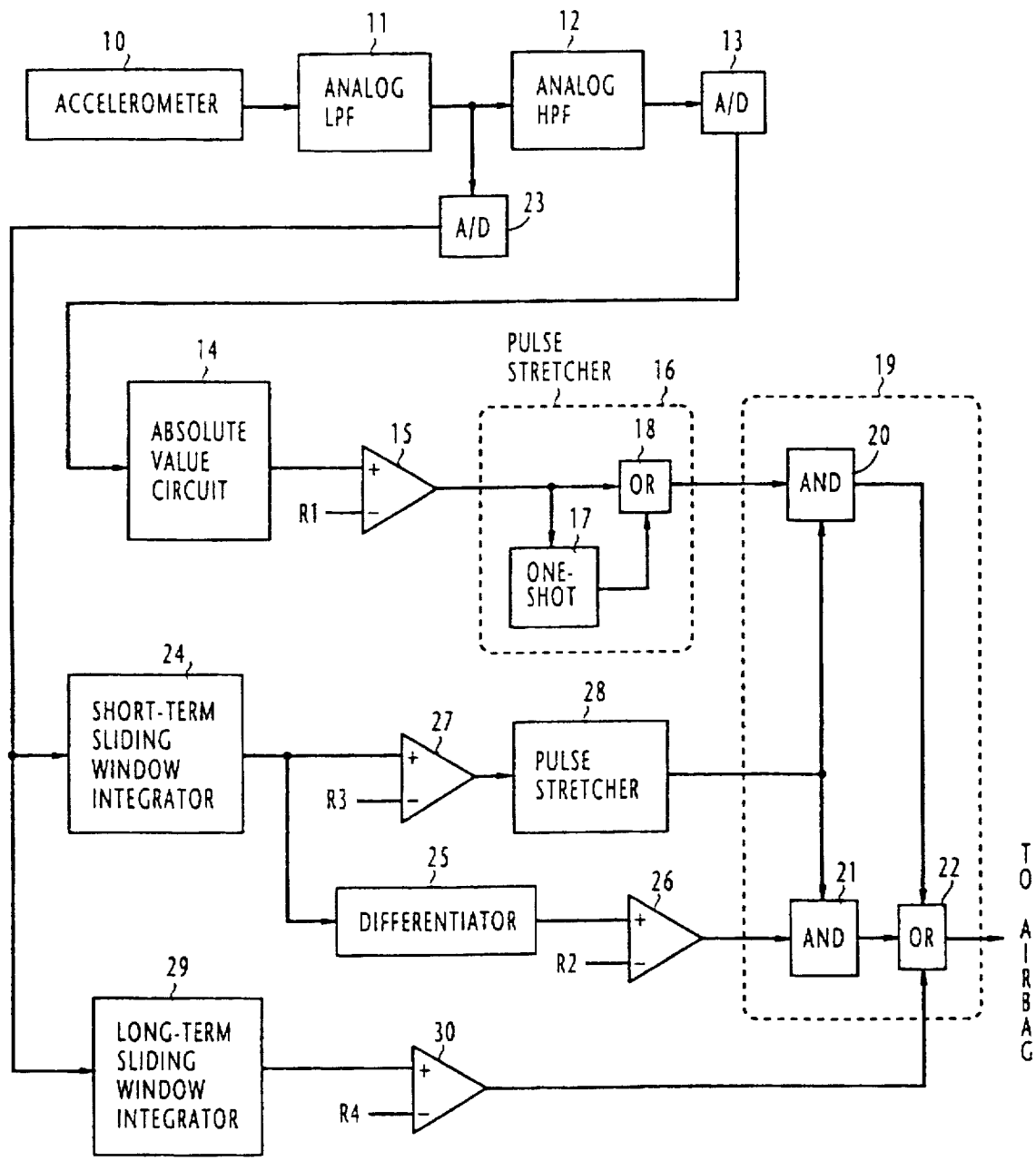
FIG. 1 is a block diagram of a vehicle crash sensor according to one embodiment of the present invention.

Referring now to FIG. 1, there is shown a crash sensor of the present invention mounted in a vehicle for operating an inflatable occupant restraint system, or airbag, when the vehicle encounters a crash. The crash sensor includes a semiconductor accelerometer 10 which consists of a strain gauge secured on a semiconductor substrate to utilize its piezoelectric effect to produce an accelerometer signal representing the acceleration/deceleration of the vehicle when it is mechanically deformed upon the application of an impact force.

To allow digital processing of the accelerometer signal without foldover (aliasing) distortion, an analog lowpass filter 11 is connected to the accelerometer 10 to cut off the frequency components of the accelerometer signal higher than twice the sampling frequency at which it will be sampled and processed by subsequent processing circuitry. The lowpass-filtered signal is applied to an analog highpass filter 12 whose cutoff point (typically, 20 Hz) is lower than the cutoff point (typically, 80 Hz) of the lowpass filter 11 to produce a band-limited signal. The band-limited accelerometer signal is applied to an analog-to-digital converter 13 where it is sampled at intervals Ts, (where Ts is typically 1 millisecond) and converted to a digital signal.

Vehicle crash can be considered as a plastic deformation of a composite of numerous resilient materials as they are broken, bent and sheared on receiving an impact force. When the vehicle experiences a crash, the deceleration signal contains unique frequency components having characteristic waveform fluctuations and a first quarter wavelength of the fundamental frequency component of the signal. The analog bandpass filter formed by the lowpass filter 11 and highpass filter 12 extracts those unique frequency components characterizing a vehicle crash.

Since the vehicle speed, on receiving an impact force, decays following a cosine curve, the impact energy of the vehicle during the zero- and 90-degree phase angles of the cosine curve can be approximated as being equal to the square value of the vehicle's speed variations. For this reason, in the prior art crash sensor the amplitude of the extracted frequency components of the deceleration signal is squared to produce a signal representative of the energy of crash impact. Instead of squaring the band-limited digital signal, the present invention reverses the negative sign of the band-limited digital signal by using an absolute value circuit 14 where the output of A/D converter 13 having negative sign is converted to positive sign to produce digital samples having absolute value (positive sign) which represent the impact energy in terms of a square-root value.

The use of the analog bandpass filter and the absolute value circuit allows low cost implementation with an 8-bit microprocessor since its cost is much lower than that of a 16-bit microprocessor. In particular, the use of the absolute value circuit, instead of a squaring circuit, significantly reduces the computational burden of a microprocessor.

The output of absolute value circuit 14 is applied to a comparator 15 where it is compared with a threshold R1 which corresponds to the square-root of the impact threshold used in the prior art crash sensor. Comparator 15 produces an output pulse when the threshold R1 is exceeded. To ensure stability and precision, the output of comparator 15 is applied to a pulse stretcher 16 consisting of a one-shot multivibrator 17 and an OR gate 18 which are connected so that the multivibrator produces a pulse of a specified duration, typically 30 milliseconds when the leading edge of the output pulse of comparator 15 exceeds the threshold of the multivibrator. The output of comparator 15 is stretched by combining it with the output pulse of multivibrator 17 in the OR gate 18.

The output of pulse stretcher 16 is applied to an AND gate 20 of a logic circuit 19 which further includes an AND gate 21 and an OR gate 22 to which the outputs of AND gates 20 and 21 are connected. The output of OR gate 22 is connected to an occupant restraint system or airbag, not shown.

The output of analog lowpass filter 11 is, on the other hand, sampled at 1-ms intervals and converted to digital form by an A/D converter 23 to produce a digital deceleration sample G(k). The output of A/D converter 23 is connected to a short-term sliding window integrator 24 with a sliding window of duration $T_{WS}$ (where $T_{WS}$ is typically 14 milliseconds). Short-term integrator 24 provides an integration of successive input digital samples that occur within a 14-ms window and shifts its window by the sample interval to produce a sum of the magnitudes of successive input digital samples. The output sample of the short-term sliding window integrator 24 represents the short-term instantaneous speed parameter V(k). This integrator 24 output is applied to a differentiator 25 where differentiation is provided on the current integrated sample V(k) and three preceding integrated samples V(k−1), V(k−2) and V(k−3) according to the formula $\{V(k)+3V(k-1)-3V(k-2)-V(k-3)\}/6$.

Figure 2:
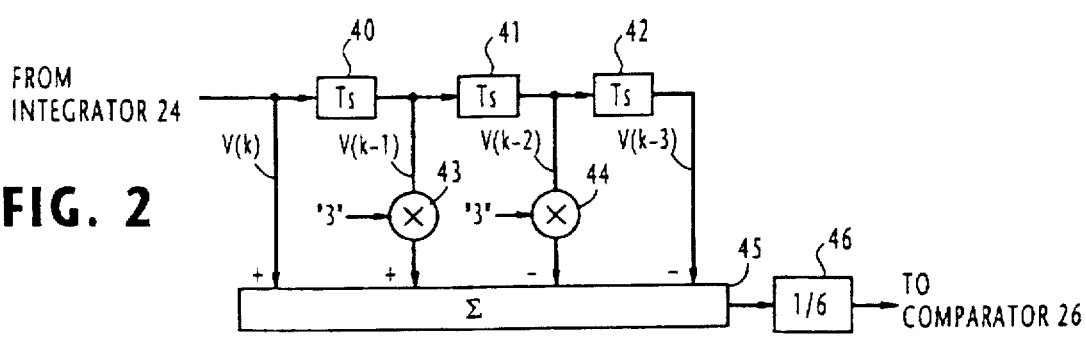
FIG. 2 is a block diagram of the differentiator of FIG. 1.

As shown in FIG. 2, the differentiator 25 comprises a series of delay elements 40, 41 and 42 forming a tapped-delay line for receiving the output of integrator 24 so that integrated samples V(k), V(k−1), V(k−2) and V(k−3) appear simultaneously at successive taps of the delay line. Multipliers 43 and 44 are connected to the delay-line taps for weighting the outputs V(k−1) and V(k−2) of delay elements 40 and 41 with an integer "3". A summing circuit 45 provides a summation of the current sample V(k) and the output of multiplier 43 and subtracting the outputs of multiplier 44 and delay element 42 from the sum. The output of summing circuit 45 is applied to a division circuit 46 where it is arithmetically divided by an integer "6".

Since the deceleration signal at the input of the short-term sliding window integrator 24 varies by an amount G(k)−G(k−$T_{WS}$) during the window interval $T_{WS}$, the output of differentiator 25 can be considered as being representative of this differential value G(k)−G(k−$T_{WS}$). The differentiator 25 output is then applied to a comparator 26 for comparison with a threshold value R2. Comparator 26 produces an output when the differentiator output exceeds the threshold value R2.

As a result, the differentiator 25 produces a high-level output when the vehicle encounters a medium-speed frontal crash which is characterized by a sharp fluctuation between two deceleration samples spaced by the interval $T_{WS}$ although no perceptible fluctuation can be observed between successive deceleration data samples.

It is found that medium-speed frontal crashes have characteristic sharp fluctuation between two deceleration samples if they are spaced by interval $T_{WS}$ even though no perceptible fluctuation is observed between successive deceleration data samples. The differentiator 25 produces a high-level output when the vehicle encounters such a medium-speed frontal crash. Therefore, the differentiator 25 can be used to advantage for detecting crash events of the type where deceleration increases gradually at first and then sharply increases as in the case of medium-speed frontal crashes.

Because of the use of the analog bandpass filter, instead of a digital bandpass filter, for detecting the vehicle deceleration, the roll-off characteristic of the analog bandpass filter is not as sharp as that of the digital bandpass filter. Therefore, the impact energy signal produced by the absolute value circuit 14 has not sufficient sensitivity to deceleration to enable precision crash/non-crash discrimination as in the case of digital bandpass filter. However, the use of differentiator 25 serves to complement this shortcoming.

The short-term integrator 24 output is further applied to a comparator 27, which compares it with a threshold R3 and provides an output to a pulse stretcher 28 if it exceeds the threshold R3. The pulse stretcher 28 stretches the duration of the comparator output to 30 milliseconds for enabling the AND gates 20 and 21.

A long-term sliding winding integrator 29 is provided for integrating the deceleration samples from A/D converter 23 with a sliding window of duration $T_{WL}$ (where $T_{WL}$ is typically 90 milliseconds). Long-term integrator 29 provides an integration of successive input digital samples that occur within a 90-ms window and shifts its window by the sample interval to produce a sum of the magnitudes of successive input digital samples. The output sample of the long-term sliding window integrator 29 represents the long-term instantaneous velocity. The output of long-term integrator 29 is compared with a threshold R4 in a comparator 30. Comparator 30 provides an output to the OR gate 22 when the integrator 29 output is higher than the threshold R4. If the vehicle encounters a padded barrier crash, the long-term velocity signal exceeds the threshold value R4 and comparator 30 produces a deployment signal.

Figure 3:
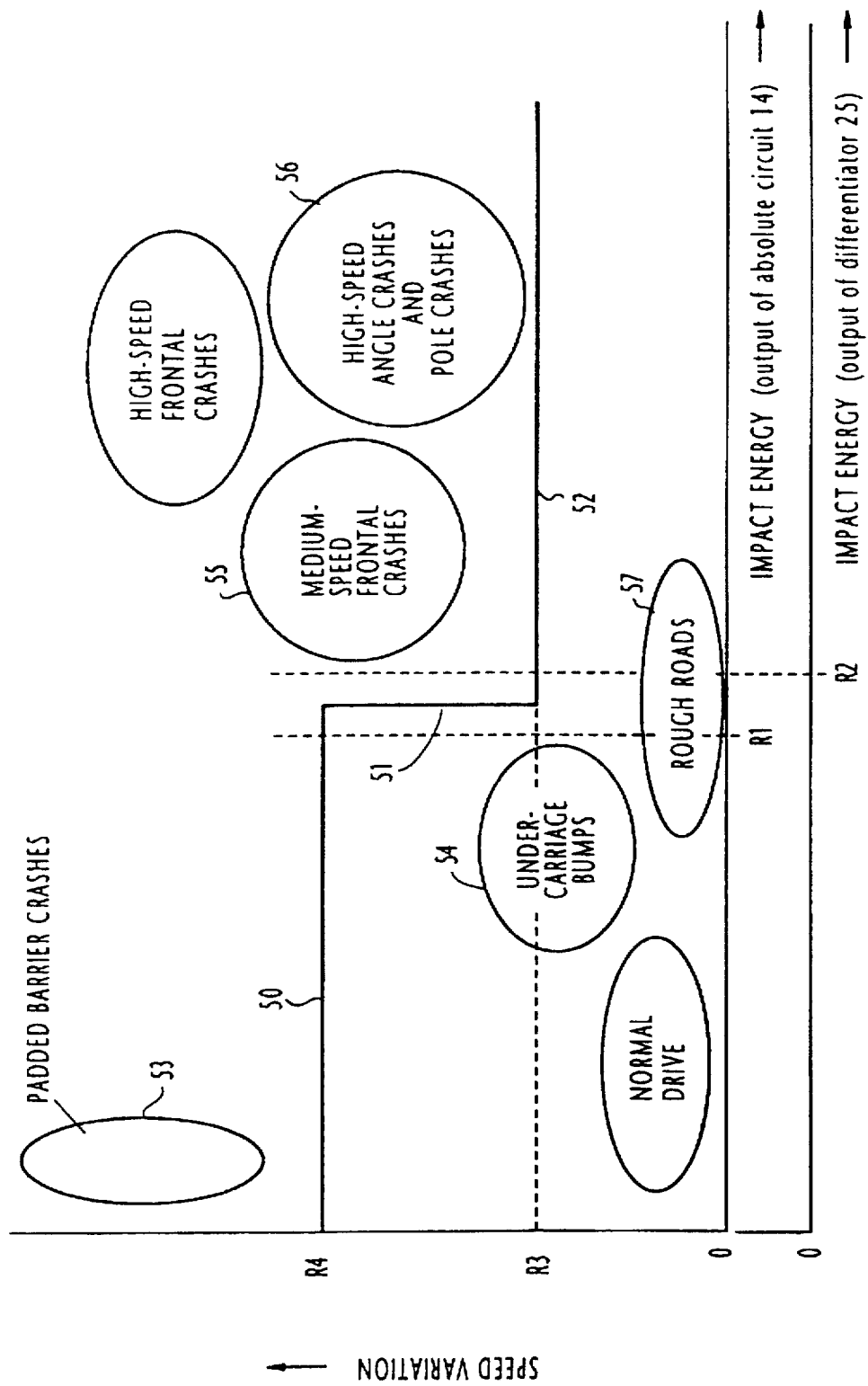
FIG. 3 is a crash/non-crash discrimination map associated with the embodiment of FIG. 1.

FIG. 3 shows a plot of speed variation versus impact energy obtained by crash/non-crash impact experiments conducted for vehicles of the type having relatively low stiffness values. The speed variation and impact energy values were measured 30-ms after impact and plotted according to different categories of impact. A horizontal line segment 50 drawn between padded barrier crashes (ellipse 53) and undercarriage bumps (ellipse 54) corresponds to the threshold R4 and a line segment 51 drawn between medium-speed frontal crash events (in circle 55) and under-carriage bumps 54 extends between the thresholds R1 and R2. A horizontal line segment 52 is drawn that separates the medium-speed frontal crashes 55 and high-speed angle and pole crash events (circle 56) on the one hand and rough roads (ellipse 57) on the other. The line segments 50, 51 and 52 form a demarcation line between crash events and non-crash events.

The OR gate 22 supplies a deployment signal to the airbag when threshold values R1 and R3 are simultaneously exceeded, or when threshold values R2 and R3 are simultaneously exceeded, or when the threshold value R4 is exceeded.

The experiments show that the accelerometer of vehicles with very low stiffness values produce a rapidly varying deceleration signal during the initial stage of impact (typically, within the period of 15 ms to 35 ms of the impact) due to fracture of the bumper and the engine compartment. The first impact energy signal represented by the output of absolute value circuit 14 has a rich content of those frequency components which are uniquely generated on receiving an impact, resulting in the generation of an output from the pulse stretcher 16. In such instances, the velocity signal represented by the output of short-term sliding window integrator 24 will also exceed the threshold value R3 and the AND gate 20 is activated to produce a deployment signal.

In the case of vehicles with medium values of stiffness, on the other hand, the first impact energy signal has no rich content of the impact characteristic frequency components as in the case of lower stiffness vehicles. However, the short-term velocity signal is higher than threshold R3, and the second impact energy signal represented by the output of differentiator 25 exceeds the threshold R2 and activates the AND gate 21 to produce a deployment signal, instead of the deployment signal from AND gate 20.

Figure 4:
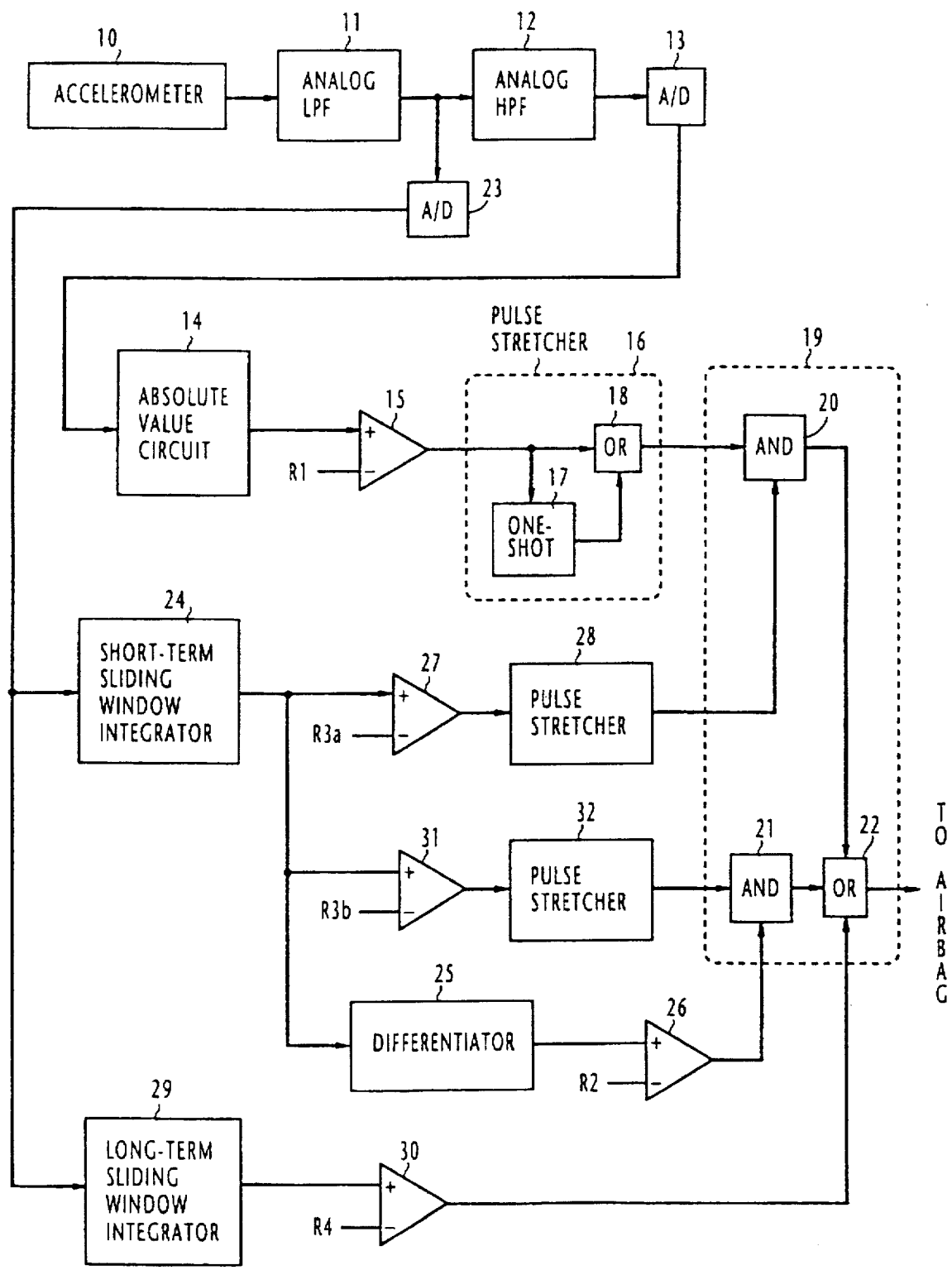
FIG. 4 is a block diagram of a vehicle crash sensor according to a preferred embodiment of the present invention.

FIG. 4 is a block diagram of a modified embodiment of the present invention which differs from the previous embodiment by the inclusion of a comparator 31 for comparing the short-term velocity signal with a threshold value R3b, and a pulse stretcher 32. In FIG. 4, the comparator 27 compares the short-term velocity signal with a threshold R3a, and the AND gate 21 is arranged to receive the outputs of pulse stretcher 32 and comparator 26.

FIG. 5 shows a plot of speed variation versus impact energy obtained by crash/non-crash impact experiments conducted for vehicles of the type having relatively high stiffness values. FIG. 5 differs from FIG. 3 in that threshold values R3a and R3b correspond respectively to above and below the line segment 52.

The experiments show that the accelerometer of vehicles with high stiffness values produce a low amplitude deceleration signal during the initial stage of impact since the initial impact energy is absorbed by the vehicle frontal structure. Medium-speed frontal crash impact produced in such vehicles causes the deceleration signal to increase gradually at first and then sharply increase. Differentiator 25 detects such a deceleration characteristic and produces a significantly high output signal following the initial impact absorbing stage, thus resulting in the generation of an output from the comparator 26. Concurrently, the velocity signal at the output of integrator 24 exceeds the threshold value R3b and the AND gate 21 is activated to produce a deployment signal.

On the other hand, if the high-stiffness vehicles encounter a crash event such as high-speed frontal crash, high-speed angle crash or pole crash, the first impact energy signal of the absolute value circuit 14 has a higher-than-R1 level and the short-term velocity signal of integrator 24 exceeds the 28 threshold R3a of comparator 27 to activate the AND gate 20.

The foregoing description shows only preferred embodiments of the present invention. Various modifications are apparent to those skilled in the art without departing from the scope of the present invention which is only limited by the appended claims.

What is claimed is:

1. A method for sensing a vehicle crash comprising the steps of:
   a) detecting deceleration of a vehicle on receiving an impact to produce an analog deceleration signal and converting the analog deceleration signal to digital samples;
   b) successively integrating said digital samples which occur during a specified window, successively shifting the window by an interval of a digital sample and producing a velocity signal;
   c) bandpass filtering the analog deceleration signal though an analog bandpass filter to produce a bandpass-filtered signal containing frequency components which appear uniquely on receiving said impact, and converting the bandpass-filtered signal to a digital bandpass-filtered signal;
   d) converting the digital bandpass-filtered signal to a first impact energy signal having an absolute digital value and differentiating the velocity signal to produce a second impact energy signal;
   e) comparing the first and second impact energy signals with first and second threshold values and producing first and second decision outputs when the first and second impact energy signals are respectively higher than the first and second threshold values, and comparing the velocity signal with a third threshold value and producing a third decision output when the velocity signal is higher than the third threshold value; and
   f) operating an occupant restraint system in response to simultaneous presence of the first and third decision outputs and operating the occupant restraint system in response to simultaneous presence of the second and third decision outputs.

2. A method as claimed in claim 1, wherein the step (d) comprises the step of differentiating the velocity signal according to a formula $\{V(k)+\alpha V(k-1)-\alpha V(k-2)-V(k-3)\}/\beta$, where $V(k)$ is a digital sample of the velocity signal, $\alpha$ and $\beta$ are integers.

3. A method as claimed in claim 2, wherein said $\alpha$ and $\beta$ are equal to 3 and 6, respectively.

4. A method for sensing a vehicle crash comprising the steps of:
   a) detecting deceleration of a vehicle on receiving an impact to produce an analog deceleration signal and converting the analog deceleration signal to digital samples;
   b) successively integrating said digital samples which occur during a specified window, successively shifting the window by an interval of a digital sample and producing a velocity signal;

c) bandpass-filtering the analog deceleration signal through an analog bandpass filter to produce a bandpass-filtered signal containing frequency components which appear uniquely on receiving said impact, and converting the bandpass-filtered signal to a digital bandpass-filtered signal;

d) converting the digital bandpass-filtered signal to a first impact energy signal having an absolute digital value and differentiating the velocity signal to produce a second impact energy signal;

e) comparing the first and second impact energy signals with first and second threshold values and producing first and second decision outputs when the first and second impact energy signals are respectively higher than the first and second threshold values, and comparing the velocity signal with third and fourth threshold values and producing third and fourth decision outputs when the velocity signal is higher than the third and fourth threshold values, respectively; and f) operating an occupant restraint system in response to simultaneous presence of the first and third decision outputs and operating the occupant restraint system in response to simultaneous presence of the second and fourth decision outputs.

5. A method as claimed in claim 4, wherein the step (d) comprises the step of differentiating the velocity signal according to a formula $\{V(k)+\alpha V(k-1)-\alpha V(k-2)-V(k-3)\}/\beta$, where $V(k)$ is a digital sample of the velocity signal, $\alpha$ and $\beta$ are integers.

6. A method as claimed in claim 5, wherein said $\alpha$ and $\beta$ are equal to 3 and 6, respectively.

7. A method for sensing a vehicle crash comprising the steps of:

a) detecting deceleration of a vehicle on receiving an impact to produce an analog deceleration signal and converting the analog deceleration signal to digital samples;

b) successively integrating said digital samples which occur during a short-term window, successively shifting the short-term window by an interval of a first digital sample and producing a first velocity signal;

c) successively integrating said digital samples which occur during a long-term widow, successively shifting the long-term window by an interval of a second digital sample and producing a second velocity signal;

d) bandpass-filtering the analog deceleration signal through an analog bandpass filter to produce an analog bandpass-filtered signal containing frequency components which appear uniquely on receiving said impact, and converting the analog bandpass-filtered signal to a digital bandpass-filtered signal;

e) converting the digital bandpass-filtered signal to a first impact energy signal having an absolute digital value and differentiating the velocity signal to produce a second impact energy signal;

f) comparing the first and second impact energy signal with first and second threshold values and producing first and second decision outputs when the first and second impact energy signals are respectively higher than the first and second threshold values, and comparing the first and second velocity signals with third and fourth threshold values and producing third and fourth decision outputs when the first and second velocity signals are respectively higher than the third and fourth threshold values; and g) operating an occupant restraint system in response to simultaneous presence of the first and third decision outputs, operating the occupant restraint system in response to simultaneous presence of the second and third decision outputs, and operating the occupant restraint system in response to the fourth decision output.

8. A method as claimed in claim 7, wherein the step (e) comprises the step of differentiating the velocity signal according to a formula $\{V(k)+\alpha V(k-1)-\alpha V(k-2)-V(k-3)\}/\beta$, where $V(k)$ is a digital sample of the velocity signal, $\alpha$ and $\beta$ are integers.

9. A method as claimed in claim 8, wherein said $\alpha$ and $\beta$ are equal to 3 and 6, respectively.

10. A method for sensing a vehicle crash comprising the steps of:

a) detecting deceleration of a vehicle on receiving an impact to produce an analog deceleration signal and converting the analog deceleration signal to digital samples;

b) successively integrating said digital samples which occur during a short-term window, successively shifting the short-term window by an interval of a first digital sample and producing a first velocity signal;

c) successively integrating said digital samples which occur during a long-term window, successively shifting the long-term window by an interval of a second digital sample and producing a second velocity signal;

d) bandpass-filtering the analog deceleration signal though an analog bandpass filter to produce an analog bandpass-filtered signal containing frequency components which appear uniquely on receiving said impact, and converting the analog bandpass-filtered signal to a digital bandpass-filtered signal;

e) converting the digital bandpass-filtered signal to a first impact energy signal having an absolute digital value and differentiating the velocity signal to produce a second impact energy signal;

f) comparing the first and second impact energy signals with first and second threshold values and producing first and second decision outputs when the first and second impact energy signals are respectively higher than the first and second threshold values, comparing the first velocity signal with third and fourth threshold values and producing third and fourth decision outputs when the first velocity signal is higher than the third and fourth threshold values, respectively, and comparing the second velocity signal with a fifth threshold value and producing a fifth decision output when the second velocity signal is higher than the fifth threshold value;

g) operating an occupant restraint system in response to simultaneous presence of the first and third decision outputs, operating the occupant restraint system in response to simultaneous presence of the second and fourth decision outputs, and operating the occupant restraint system in response to the fifth decision output.

11. A method as claimed in claim 10, wherein the step (e) comprises the step of differentiating the velocity signal according to a formula $\{V(k)+\alpha V(k-1)-\alpha V(k-2)-V(k-3)\}/\beta$, where $V(k)$ is a digital sample of the velocity signal, $\alpha$ and $\beta$ are integers.

12. A method as claimed in claim 11, wherein said $\alpha$ and $\beta$ are equal to 3 and 6, respectively.

13. A vehicle crash sensor comprising:

an accelerometer for producing an analog accelerometer signal representative of a deceleration of a vehicle on receiving an impact;

an analog bandpass filter for bandpass-filtering said analog accelerometer signal and producing an analog bandpass-filtered signal containing frequency components which appear uniquely on receiving said impact;

a first analog-to-digital (A/D) converter for covering the analog bandpass-filtered signal to a digital bandpass-filtered signal;

a second A/D converter for converting the analog accelerometer signal to digital samples;

an absolute value circuit for converting the digital bandpass-filtered signal to a first impact energy signal having an absolute digital value;

a sliding window integrator for successively integrating said digital samples which occur during a specified window which is successively shifted by an interval of a digital sample and producing a velocity signal;

a differentiator for differentiating the velocity signal and producing therefrom a second impact energy signal;

first comparator means for producing a first decision output when the first impact energy signal is higher than a first threshold value;

second comparator means for producing a second decision output when the second impact energy signal is higher than a second threshold value;

third comparator means for producing a third decision output when the velocity signal is higher than a third threshold value; and a logic circuit for operating an occupant restraint system in response to simultaneous presence of the first and third decision outputs and for operating the occupant restraint system in response to simultaneous presence of the second and third decision outputs.

14. A vehicle crash sensor as claimed in claim 13, wherein said differentiator differentiates the velocity signal according to a formula $\{V(k)+\alpha V(k-1)-\alpha V(k-2)-V(k-3)\}/\beta$, where $V(k)$ is a digital sample of the velocity signal, $\alpha$ and $\beta$ are integers.

15. A vehicle crash sensor as claimed in claim 14, wherein said $\alpha$ and $\beta$ are equal to 3 and 6, respectively.

16. A vehicle crash sensor as claimed in claim 13, wherein said sliding window integrator is a short-term sliding window integrator for successively integrating said digital samples which occur during a short-term window which is successively shifted by an interval of a digital sample and producing a velocity signal of short-term variation, said vehicle crash sensor further comprising:

a long-term sliding window integrator for successively integrating said digital samples which occur during a long-term window which is successively shifted by an interval of a digital sample and producing a velocity signal of long-term variation; and fourth comparator means for producing a fourth decision output when the long-term variation velocity signal is higher than a fourth threshold value, wherein said logic circuit operates the occupant restraint system in response to the fourth decision output for operating said occupant restraint system.

17. A vehicle crash sensor as claimed in claim 13, wherein said analog bandpass filter comprises an analog lowpass filter and an analog highpass filter connected in series to the analog lowpass filter, the analog highpass filter having a cut-off frequency lower than a cut-off frequency of the analog lowpass filter, wherein said first A/D converter is connected to an output of the analog highpass filter and said second A/D converter is connected to an output of the analog lowpass filter.

18. A vehicle crash sensor comprising:

an accelerometer for producing an analog accelerometer signal representative of a deceleration of a vehicle on receiving an impact;

an analog bandpass filter for bandpass-filtering said analog accelerometer signal and producing an analog bandpass-filtered signal containing frequency components which appear uniquely on receiving said impact;

a first analog-to-digital (A/D) converter for converting the analog bandpass-filtered signal to a digital bandpass-filter signal;

a second A/D converter for converting the analog accelerometer signal to digital samples;

an absolute value circuit for converting the digital bandpass-filtered signal to a first impact energy signal having an absolute digital value;

a sliding window integrator for successively integrating said digital samples which occur during a specified window which is successively shifted by an interval of a digital sample and producing a velocity signal;

a differentiator for differentiating the velocity signal and producing therefrom a second impact energy signal;

first comparator means for producing a first decision output when the first impact energy signal is higher than a first threshold value;

second comparator means for producing a second decision output when the second impact energy signal is higher than a second threshold value;

third comparator means for producing a third decision output when the velocity signal is higher than a third threshold value;

fourth comparator means for producing a fourth decision output when the velocity signal is higher than a fourth threshold value, the fourth threshold value being lower than the third threshold value; and a logic circuit for operating an occupant restraint system in response to simultaneous presence of the first and third decision outputs and for operating an occupant restraint system in response to simultaneous presence of the second and fourth decision outputs.

19. A vehicle crash sensor as claimed in claim 18, wherein said differentiator differentiates the velocity signal according to a formula $\{V(k)+\alpha V(k-1)-\alpha V(k-2)-V(k-3)\}/\beta$, where $V(k)$ is a digital sample of the velocity signal, $\alpha$ and $\beta$ are integers.

20. A vehicle crash sensor as claimed in claim 19, wherein said $\alpha$ and $\beta$ are equal to 3 and 6, respectively.

21. A vehicle crash sensor as claimed in claim 18, wherein said sliding window integrator is a short-term sliding window integrator for successively integrating said digital samples which occur during a short-term window which is successively shifted by an interval of a digital sample and producing a velocity signal of short-term variation, said vehicle crash sensor further comprising:

a long-term sliding window integrator for successively integrating said digital samples which occur during a long-term window which is successively shifted by an interval of a digital sample and producing a velocity signal of long-term variation; and fifth comparator means for producing a fifth decision output when the long-term variation velocity signal is higher than a fifth threshold value.

wherein said logic circuit operates the occupant restraint system in response to the fifth decision output for operating said occupant restraint system.

22. A vehicle crash sensor as claimed in claim 18, wherein said analog bandpass filter comprises an analog lowpass filter and an analog highpass filter connected in series to the analog lowpass filter, the analog highpass filter having a cut-off frequency lower than a cut-off frequency of the lowpass filter, wherein said first A/D converter is connected to an output of the analog highpass filter and said second A/D converter is connected to an output of the analog lowpass filter.

* * * * *